(12) United States Patent
Zhu et al.

(10) Patent No.: US 11,045,051 B2
(45) Date of Patent: Jun. 29, 2021

(54) BLADE SEAT ASSEMBLY, BLENDING CUP ASSEMBLY, AND FOOD PROCESSOR

(71) Applicant: GUANGDONG MIDEA CONSUMER ELECTRIC MANUFACTURING CO., LTD., Foshan (CN)

(72) Inventors: Lei Zhu, Foshan (CN); Jianfei Xu, Foshan (CN); Weijie Chen, Foshan (CN); Xianghe Zeng, Foshan (CN); Li Xiao, Foshan (CN); Weijun Liu, Foshan (CN); Yan She, Foshan (CN)

(73) Assignee: GUANGDONG MIDEA CONSUMER ELECTRICS MFG CO., LTD., Foshan (CN)

( * ) Notice: Subject to any disclaimer, the term of this patent is extended or adjusted under 35 U.S.C. 154(b) by 173 days.

(21) Appl. No.: 16/279,881

(22) Filed: Feb. 19, 2019

(65) Prior Publication Data

US 2019/0174961 A1    Jun. 13, 2019

Related U.S. Application Data

(63) Continuation of application No. PCT/CN2017/096184, filed on Aug. 7, 2017.

(30) Foreign Application Priority Data

Aug. 19, 2016  (CN) .......................... 201610697890.5
Aug. 19, 2016  (CN) .......................... 201620909095.3

(51) Int. Cl.
*A47J 43/07* (2006.01)

(52) U.S. Cl.
CPC ........... *A47J 43/0722* (2013.01); *A47J 43/07* (2013.01); *A47J 43/0716* (2013.01)

(58) Field of Classification Search
CPC .. A47J 43/0722; A47J 43/085; A47J 43/0727; A47J 43/087; A47J 43/09
(Continued)

(56) References Cited

U.S. PATENT DOCUMENTS

| 6,336,603 B1 * | 1/2002 | Karkos, Jr. ............ A23G 9/045 241/101.2 |
| 8,142,068 B2 * | 3/2012 | McGill ............... A47J 43/0761 366/347 |

(Continued)

FOREIGN PATENT DOCUMENTS

| CN | 201085532 Y | 7/2008 |
| CN | 102068193 A | 5/2011 |

(Continued)

OTHER PUBLICATIONS

Guangdong Midea Consumer Electrics Manufacturing Co. Ltd., International Search Report and Written Opinion, PCT/CN2017/096184, dated Nov. 2, 2017, 21 pgs.

*Primary Examiner* — Faye Francis
(74) *Attorney, Agent, or Firm* — Morgan, Lewis & Bockius LLP

(57) ABSTRACT

The present disclosure discloses a blade seat assembly including a blade assembly, a clasp assembly, and a blade seat. The blade assembly includes a blade and a shaft, the blade being connected to one end of the shaft. The blade seat defines a mounting groove, and the other end of the shaft detachably is connected to the mounting groove via the clasp assembly. The present disclosure also provides a blending cup assembly and a food processor, which use the blade seat assembly. The technical scheme of the present disclosure aims to enable the blade assembly to be disassembled.

17 Claims, 9 Drawing Sheets

(58) Field of Classification Search
USPC .................................................. 241/282.2
See application file for complete search history.

(56) References Cited

U.S. PATENT DOCUMENTS

| | | | | |
|---|---|---|---|---|
| 9,585,519 | B2* | 3/2017 | Guo | A47J 43/0711 |
| 9,603,488 | B2* | 3/2017 | Upston | A47J 43/0716 |
| 10,112,159 | B2* | 10/2018 | Liu | A47J 43/0722 |
| 2011/0205834 | A1* | 8/2011 | McGill | A47J 43/046 |
| | | | | 366/205 |
| 2014/0239107 | A1* | 8/2014 | Upston | A47J 43/0716 |
| | | | | 241/282.2 |
| 2016/0296074 | A1* | 10/2016 | Repac | A47J 43/0777 |
| 2016/0331181 | A1* | 11/2016 | Dickson, Jr. | B01F 7/162 |
| 2019/0045976 | A1* | 2/2019 | Ouyang | A47J 43/046 |

FOREIGN PATENT DOCUMENTS

| | | |
|---|---|---|
| CN | 201855167 U | 6/2011 |
| CN | 103565302 A | 2/2014 |
| CN | 203987615 U | 12/2014 |
| CN | 105725732 A | 7/2016 |
| CN | 206120131 U | 4/2017 |
| JP | 2003259995 A | 9/2003 |
| KR | 101632395 B1 | 6/2016 |

* cited by examiner

BLADE SEAT ASSEMBLY, BLENDING CUP ASSEMBLY, AND FOOD PROCESSOR

CROSS-REFERENCE TO RELATED APPLICATIONS

This patent application is a continuation application of PCT Patent Application No. PCT/CN2017/096184, entitled "BLADE SEAT ASSEMBLY, BLENDING CUP ASSEMBLY, AND FOOD PROCESSOR" filed on Aug. 7, 2017, which claims priority to (i) Chinese Patent Application No. 201610697890.5, entitled "BLADE SEAT ASSEMBLY, BLENDING CUP ASSEMBLY, AND FOOD PROCESSOR" filed with Chinese Patent Office on Aug. 19, 2016, and (ii) Chinese Patent Application No. 201620909095.3, entitled "BLADE SEAT ASSEMBLY, BLENDING CUP ASSEMBLY, AND FOOD PROCESSOR" filed with Chinese Patent Office on Aug. 19, 2016, all of which are incorporated herein by reference in their entirety.

TECHNICAL FIELD

The present disclosure relates to a blade seat assembly, a blending cup assembly, and a food processor using the blade seat assembly.

BACKGROUND

Food processor integrates the functions of products such as juicer, soy-bean milk maker, ice cream machine, food processor, and grinder to achieve multiple purposes. Blade assembly of the food processor may instantly break the food cell wall and release plant biochemical substances. Due to the ultra-high rotating speed of its motor (over 25000 rpm), the food processor can instantly break cell walls of fruits and vegetables to effectively extract plant biochemical substances. Thus the food processor has become the preferred household electrical appliance for modern home health care and health preservation. The latest generation of food processor is a food processor with more functions, which integrates the functions of heating and stirring. It may not only make vegetable and fruit juice, and sand ice, but also heat to make soy-bean milk, fish soup, soup with Chinese medicinal material, porridge, etc.

Blade assembly in food processor in prior art is configured for stirring or crushing objects to be stirred, and is fixedly connected to other components in the food processor.

The disadvantage of the blade assembly above is that the blade assembly is not detachable. As it usually happens that residue of the objects to be stirred remains around the blade assembly and at the bottom of the cup, it is necessary to clean the blade assembly and the cup together, which is prone to bring a scratch to users.

SUMMARY

The main purpose of the present disclosure is to provide a blade seat assembly, aiming at avoiding the disadvantage that the blade assembly cannot be disassembled.

In order to achieve the above purpose, the blade seat assembly provided by the present disclosure includes a blade assembly, a clasp assembly, and a blade seat; the blade assembly includes a blade and a shaft, the blade is connected to one end of the shaft; the blade seat defines a mounting groove, and the other end of the shaft detachably is connected to the mounting groove via the clasp assembly.

In some embodiments, the clasp assembly includes a clasp, the clasp includes a main body which defines a through hole, and the side wall of the shaft defines a groove; when the clasp locks the shaft in the mounting groove, the wall of the through hole abuts against the wall of the groove; when the clasp releases the shaft from the mounting groove, the wall of the through hole is spaced apart from the wall of the groove to allow the shaft to pass through the through hole.

In some embodiments, the clasp assembly includes two oppositely defined clasps, the two clasps overlaps along the extension direction of the shaft, the two through holes of the two clasps at least partially overlap, and the shaft passes through the overlapping area of the two through holes.

In some embodiments, the wall of the groove and/or the wall of the through hole define(s) with an anti-skid structure.

In some embodiments, one end of the main body which defines the through hole is accommodated in the mounting groove, one end of the main body away from the through hole is an operation portion defined outside the mounting groove.

In some embodiments, the blade seat assembly further includes a distance control assembly, which is configured to adjust a distance between the wall of the through hole and the wall of the groove, making the wall of the through hole abut against or space apart from the wall of the groove.

In some embodiments, the bottom of the mounting groove defines an inserting groove, and one end of the shaft away from the blade is connected to the inserting groove.

In some embodiments, the clasp further includes a baffle, which is defined in the mounting groove, the bottom of the mounting groove defines an insertion column, and the inserting groove is defined at one end of the insertion column away from the bottom of the mounting groove; the baffle is perpendicular to the main body, and is defined opposite to the outer side wall of the insertion column at intervals; the distance control assembly is an elastic component, and the elastic component is elastically compressed between the baffle and the outer side wall of the insertion column.

In some embodiments, one end of the wall of the mounting groove away from the bottom defines a limiting groove by recessing toward the bottom, the limiting groove passes through the groove wall, and the main body passes through the limiting groove.

In some embodiments, the blade seat assembly further includes a blade seat cover, which covers an opening of the mounting groove, detachably is connected to the blade seat, and defines a shaft hole configured to insert the shaft.

The present disclosure also provides a blending cup assembly, comprising a blending cup and a blade seat assembly, and one end of the blade seat assembly which defines the blade assembly is located in the blending cup.

In some embodiments, the blending cup assembly further includes an upper clutch, and one end of the blade seat assembly away from the blending cup is connected to the upper clutch.

The present disclosure also provides a food processor, which includes a main engine, a heating device and the blending cup component, and the blending cup assembly is defined upon the main engine which defines a motor, the motor is configured to drive the blade seat assembly to rotate, and the heating device is configured for heating the blending cup.

In some embodiments, the heating device includes a coil disk assembly defined in the main engine, and a magnetic conductive disk defined at the bottom of the blending cup, and the coil disk assembly and the magnetic conductive disk are oppositely defined; or the heating device includes a heat conducting plate defined at the bottom of the blending cup, and an electric heating tube or an electric heating film, which is defined at the bottom of the heat conducting plate.

In the technical scheme of the present disclosure, the blade seat defines the mounting groove, one end of the shaft is configured for connecting with the blade, the other end of the shaft is inserted into the mounting groove, and the other end of the shaft is detachably connected to the mounting groove via the clasp assembly to allow the blade assembly to be disassembled.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and persons of ordinary skill in the art can derive other drawings from the accompanying drawings without creative efforts.

DESCRIPTION OF LABELS

Figure 1:
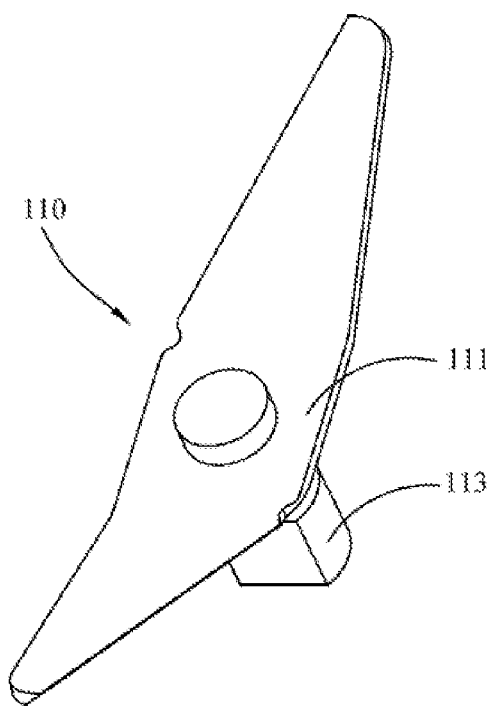
FIG. 1 is a perspective structural diagram of a blade assembly in the blade seat assembly of the present disclosure.
Figure 2:
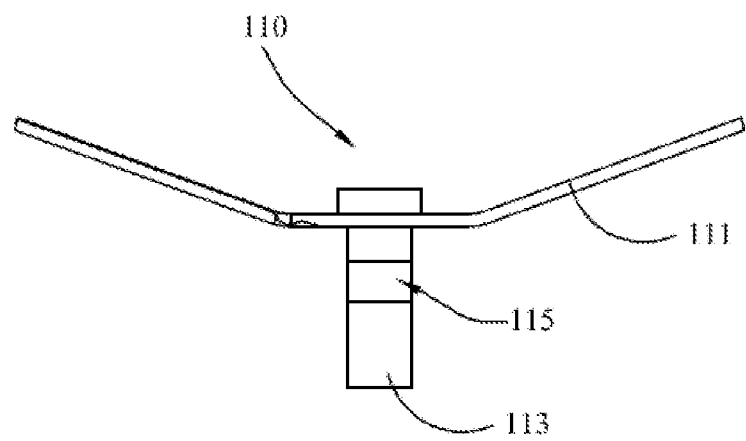
FIG. 2 is a schematic front structural view of the blade assembly shown in FIG. 1.
Figure 3:
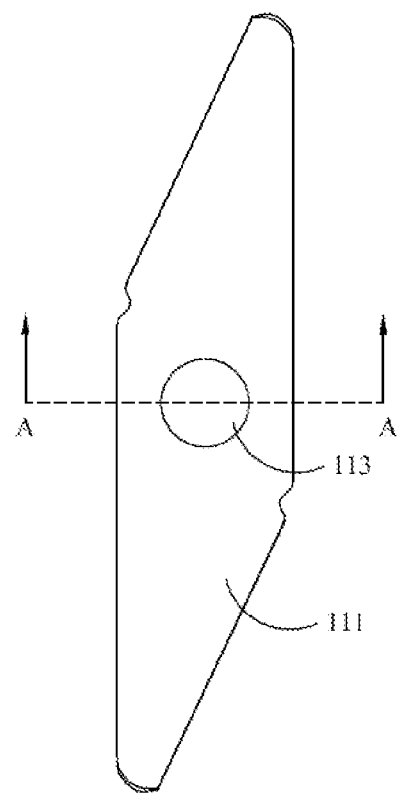
FIG. 3 is a schematic top view of the blade assembly shown in FIG. 1.
Figure 4:
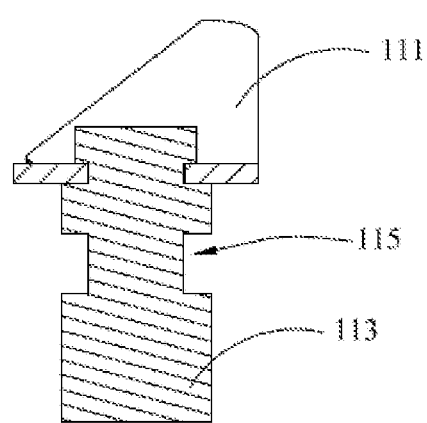
FIG. 4 is a schematic cross-sectional structural view of the blade assembly shown in FIG. 3 along line A-A.
Figure 5:
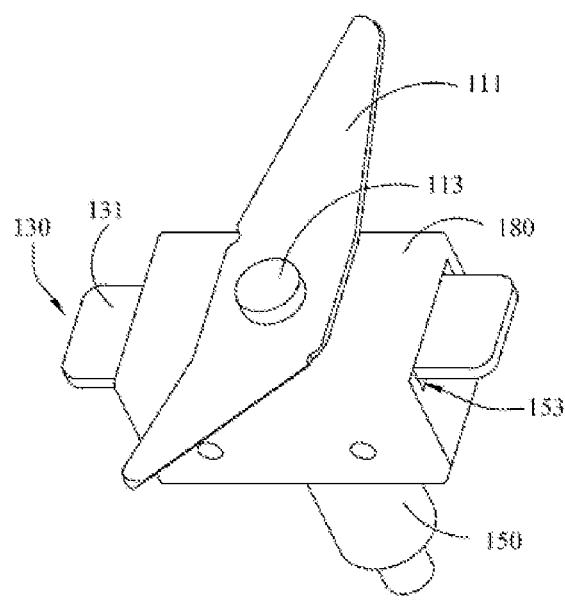
FIG. 5 is a perspective structural diagram of the blade seat assembly of the present disclosure.
Figure 6:
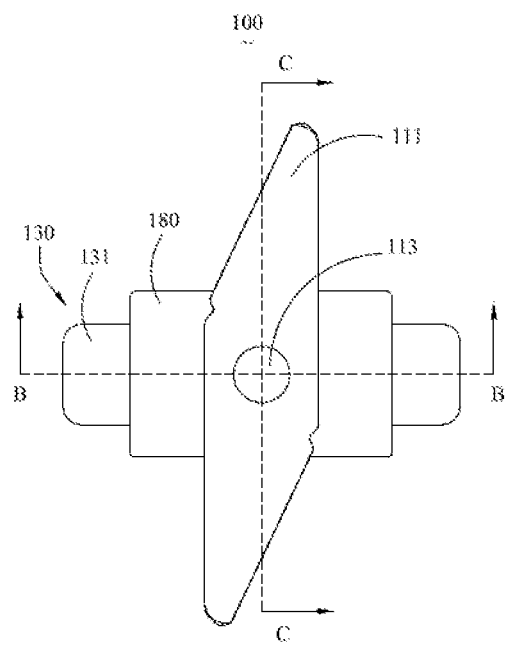
FIG. 6 is a schematic top view of the blade seat assembly shown in FIG. 5.
Figure 7:
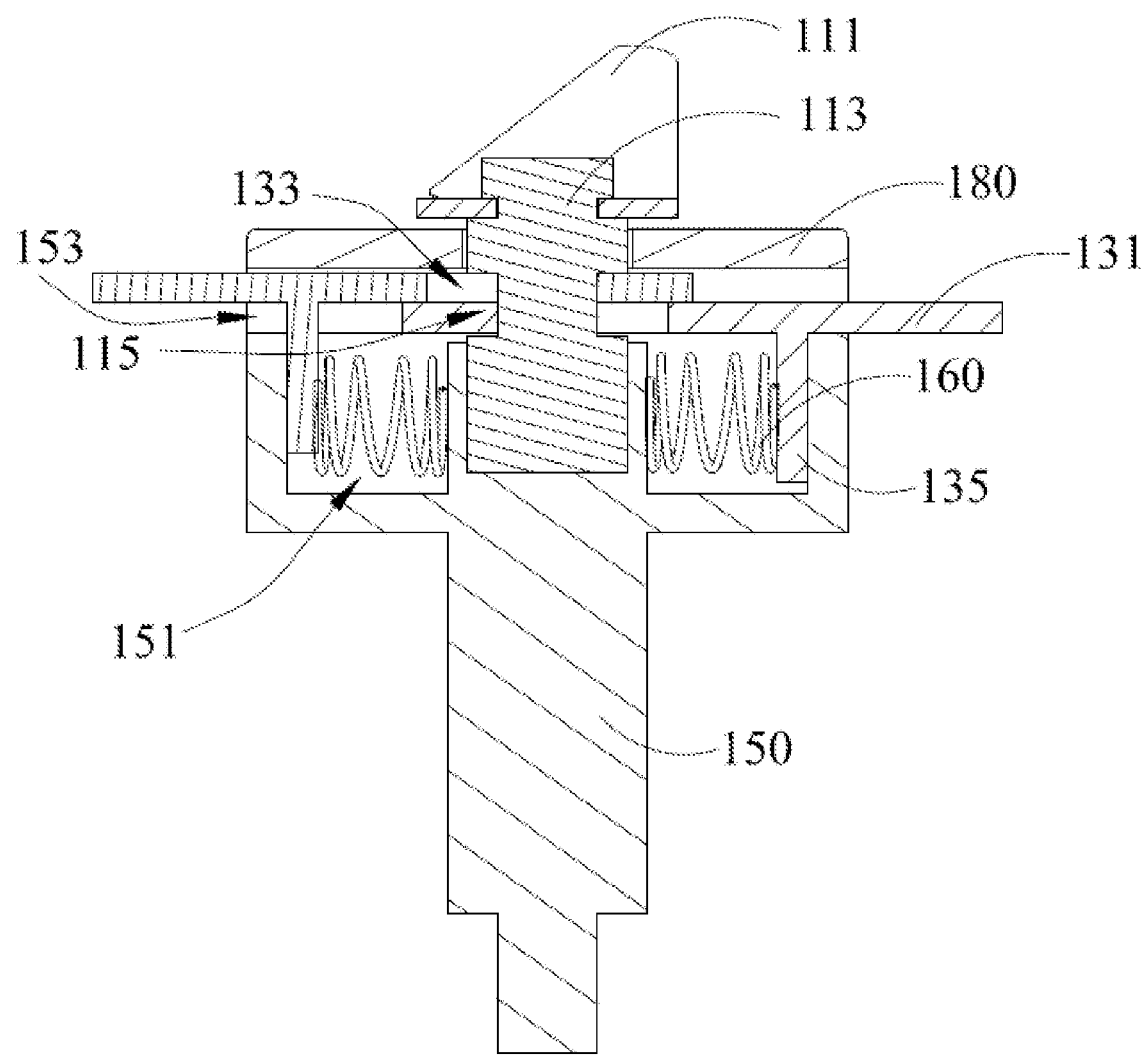
FIG. 7 is a schematic cross-sectional structural view of the blade seat assembly shown in FIG. 6 along line B-B.
Figure 8:
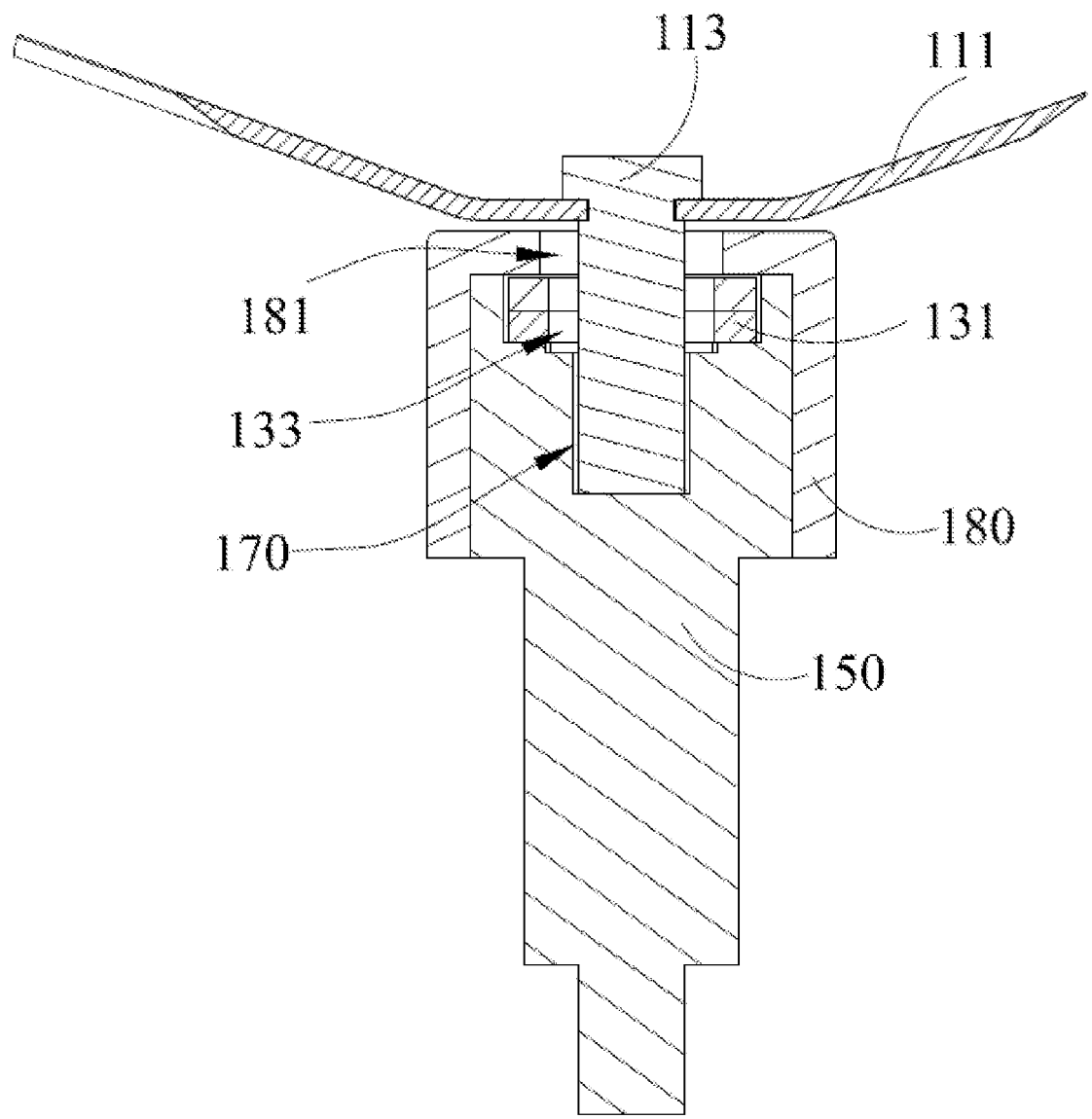
FIG. 8 is a schematic cross-sectional structural view of the blade seat assembly shown in FIG. 6 along line C-C.
Figure 9:
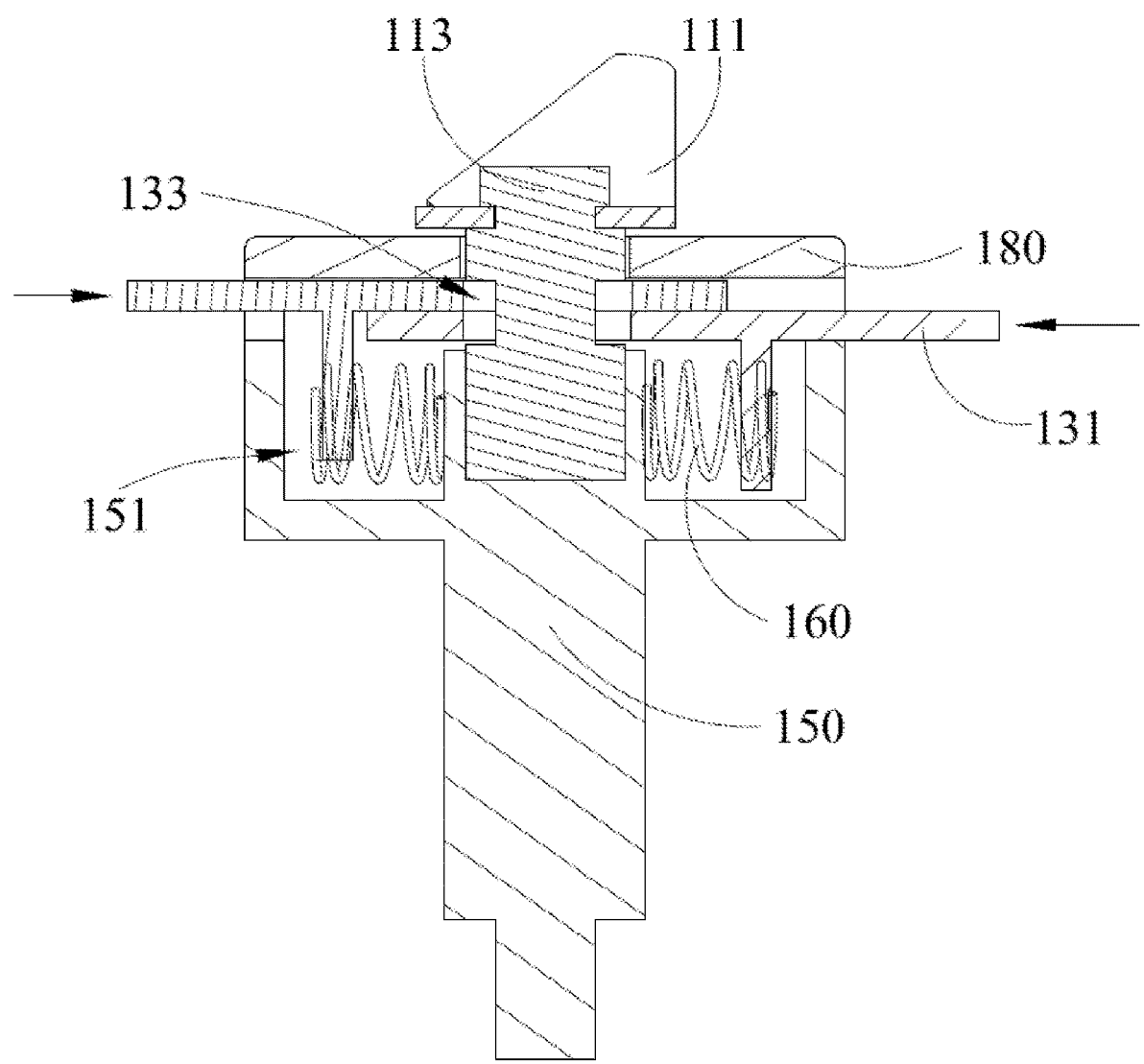
FIG. 9 is a schematic structural diagram of a clasp assembly releasing shaft in the blade seat assembly shown in FIG. 7.

| Label | Name | Label | Name |
|---|---|---|---|
| 100 | Blade seat assembly | 110 | Blade assembly |
| 111 | Blade | 113 | shaft |
| 115 | Groove | 130 | Clasp |
| 131 | Main body | 133 | Through hole |
| 135 | Baffle | 150 | Blade seat |
| 151 | Mounting groove | 153 | Limiting groove |
| 160 | Distance control assembly | 170 | Inserting groove |
| 180 | Blade seat cover | 181 | Shaft hole |

-continued

| Label | Name | Label | Name |
|---|---|---|---|
| 200 | Motor | 300 | Upper clutch |
| 400 | Lower clutch | 500 | Housing |

The implementation of the object of the present disclosure, and its functional features and advantages will be further illustrated in combination with embodiments with reference to the accompanying drawings.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It should be noted that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

In addition, the present disclosure involves descriptions such as the "first", the "second", which can only be used for describing the aim of description, and cannot be understood as indicating or suggesting relative importance or impliedly indicating the number of the indicated technical character. Therefore, the character indicated by the "first", the "second" can express or impliedly include at least one character. In the description of the present disclosure, "multiple" is at least two, such as two, three, etc., unless otherwise specifically defined.

In the present disclosure, the terms "connect" and "fix", and the like may be broadly understood unless explicitly specified and limited otherwise. For example, "fix" may be a fixed connection, a detachable connection, or an integral part. It may be mechanical connection or electrical connection. It may be directly connection or indirectly connection through an intermediate medium, and it may be the communication between two elements or the interaction between two elements, unless otherwise clearly defined. For those of ordinary skill in the art, the specific meanings of the above terms in the present disclosure may be understood according to specific situations.

In addition, the technical scheme of each embodiment may be combined with each other, however the technical scheme must base on that the ordinary skill in that art can realize the technical scheme, when the combination of the technical schemes occurs contradiction or cannot realize, it should consider that the combination of the technical schemes does not existed, and is not contained in the protection scope required by the present disclosure.

The present disclosure provides a blade seat assembly 100.

Referring to FIGS. 1 to 9, the blade seat assembly 100 proposed in the present disclosure includes a blade assembly 110, a clasp assembly (not numbered) and a blade seat 150. The blade assembly 110 includes a blade 111 and a shaft 113, and the blade 111 is connected to one end of the shaft 113; the blade seat 150 defines a mounting groove 151, and the other end of the shaft 113 is detachably connected to the mounting groove 151 via a clasp assembly.

In the technical scheme of the present disclosure, the blade seat 150 defines a mounting groove 151, one end of the shaft 113 is configured for connecting with the blade 111, the other end of the shaft 113 is inserted into the mounting groove 151, and the other end of the shaft 113 is detachably connected to the mounting groove 151 via a clasp assembly, so that the blade assembly 110 may be disassembled.

The mounting groove 151 provides a separate space for locking and disassemble the shaft 113.

The shaft 113 and the blade seat 150 are fixedly connected. In order to enhance the connection reliability, in some embodiments, the shaft 113 and the blade 111 are riveted.

The clasp assembly includes a clasp 130, the clasp 130 includes a main body 131 which defines a through hole 133, and the side wall of the shaft 113 defines a groove 115; when the clasp 130 locks the shaft 113 in the mounting groove 151, the wall of the through hole 133 abuts against the groove wall of the groove 115; when the clasp 130 releases the shaft 113 from the mounting groove 151, the wall of the through hole 133 is spaced apart from the groove wall of the groove 115 to allow the shaft 113 to pass through the through hole 133.

The wall of the through hole 133 of the clasp 130, and the groove 115 of the shaft 113 cooperatively lock and release the shaft 113.

The clasp assembly includes two oppositely defined clasps 130, the two clasps 130 overlaps along the extension direction of the shaft 113, the two through holes 133 of the two clasps 130 at least partially overlap, and the shaft 113 passes through the overlapping area of the two through holes 133.

In some embodiments, for convenience of description, the cross-sectional shape of the through-hole 133 is circular, thus the distance between the two through-holes 133 is the centerline distance of the two through-holes 133. Of course, the cross-sectional shape of the through-hole 133 is not limited to circular, and any regular or irregular shape is similarly within the scope of protection of the present disclosure.

In order to facilitate locking or releasing the shaft 113, the walls of the two through holes 133 may respectively abut against the wall of the groove 115. In this case, the two through holes 133 cooperatively form a clamp for the shaft 113 to lock the shaft 113. When the walls of the two through holes 133 are spaced apart from the groove wall of the groove 115 until the overlapping area of the two through holes 133 is sufficient for the shaft 113 to pass through, the clasp assembly releases the shaft 113.

Of course, the number of clasps 130 is not limited to this, but may be one or more.

The groove 115 may also limit the main body 131 so that the wall of the through hole 133 stably abuts against the groove 115. The groove 115 may also strengthen the locking and fixing effect of the clasp assembly on the shaft 113.

The wall of the groove 115 and/or the wall of the through hole 133 of the clasp 130 are/is defined with an anti-skid structure. The anti-skid structure may be a point-shaped protrusion or a rough surface.

The wall of the groove 115 defines an anti-skid structure to prevent the wall of the groove from rotating relative to the wall of the through hole 133.

One end of each main body 131 defined with a through hole 133 is accommodated in the mounting groove 151. One end of each main body 131 away from the through hole 133 is an operation portion (not numbered), and the operation portion is defined outside the mounting groove 151.

The operation portion may be a screw structure. When to lock the shaft 113, lock the operation portion in the blade seat 150 with a nut so that the clasp 130 abuts against the shaft 113. When to release the shaft 113, unscrew the nut so that the through hole 133 of the clasp 130 is spaced apart from the shaft 113.

It is favorable for the walls of the two through holes 113 and the side wall of the shaft 113 to form the best clamping effect, when each main body 131 is respectively perpendicular to the shaft 113.

In some embodiments, the cross-sectional shapes and cross-sectional sizes of the two through holes 133 are the same. When the through holes 133 clasp the shaft 113, the wall of the through hole 133 may completely matches the side wall of the shaft 113, realizing a good clamping effect and a better anti-dropping effect.

The operation portion of each main body 131 is defined outside the mounting groove 151. Therefore, when a user presses or swings the operation portions of the two main bodies 131 towards the inner of the mounting groove 151, that is, the distance between the two through holes 133 may be reduced to increase the overlapping area of the two through holes 133, thus to release the shaft 113, and the user may easily disassemble the blade assembly 110.

Both sides in the width direction of the two main bodies 131 are respectively aligned, and the width direction of the main bodies 131 refers to a direction perpendicular to the extending direction of the main bodies 131.

The blade seat assembly 100 further includes a distance control assembly 160 that drives the two clasps 130 to keep a maximum distance between the two through holes 133.

The distance control assembly 160 is configured to adjust the distance between the wall of the through hole 133 and the wall of the groove 115 so as to lock or release the shaft 113 with the clasp 130.

The inserting groove 170 is defined at the bottom of the mounting groove 151, and one end of the shaft 113 away from the blade 111 is connected to the inserting groove 170. Specifically, the bottom of the mounting groove 151 is defined with an insertion column, and the inserting groove 151 is defined at one end of the insertion column away from the bottom of the mounting groove 151.

While the shaft 113 is fixed by using the clasp assembly, the inserting groove 170 is further adopted to connect the end of the shaft 113 away from the blade 111, which is beneficial for enhancing the connection reliability between the shaft 113 and the blade seat 150.

When the blade seat 150 is driven to rotate by an external force, the shaft 113 rotates together with the shaft 113. In order to prevent slippage between the shaft 113 and the blade seat 150, in some embodiments, the shaft 113 is defined with a cylindrical shape with a flat position (see FIG. 1). The flat position refers to a flat position that is defined to facilitate the fixation of the shaft 113. The inserting groove 170 has the same shape as the shaft 113. The inserting groove 170 is cooperatively connected to the shaft 113, which defines the flat position, to enhance the connection reliability between the two.

The clasp 130 further includes a baffle 135 defined in the mounting groove 151, the bottom of the mounting groove 151 is defined with an insertion column, and the inserting groove 151 is defined at one end of the insertion column away from the bottom of the mounting groove 151; the baffle 135 is perpendicular to the main body 131, and the baffle 135 and the outer side wall of the insertion column are oppositely defined at intervals. The distance control assembly 160 is an elastic assembly which is elastically compressed between the baffle 135 and the outer side wall of the insertion column.

In some embodiments, the elastic component is a spring, of course, the distance control assembly 160 may be any component with elastic telescopic function.

In some embodiments, there are two main bodies 131 and two elastic components. The two elastic components are respectively defined at two sides of the inserting groove 170, and one end of each elastic component abuts against the outer side wall of the insertion column, while the other end abuts against the baffle 135.

In order to facilitate disassembly and replacement, the spring is elastically compressed in the mounting groove 151.

The elastic force of the elastic component makes the baffle 135 abut against the inner wall of the mounting groove 151, and makes the walls of the two through holes 133 oppositely clasp both sides of the groove 115.

Squeezing the operation portions of the two main bodies 131 may further compress the elastic assembly to release the shaft 113.

One end of the wall (not labeled) of the mounting groove 151 away from the bottom is recessed toward the bottom of the groove to form a limiting groove 153, the limiting groove 153 passes through the groove wall, and the main body 131 passes through the limiting groove 153.

The position of the main body 131 in the vertical direction is defined by the limiting groove 153. In some embodiments, the limiting grooves 153 are two oppositely defined, and each main body 131 respectively passes through one limiting groove 153.

The blade seat assembly 100 further includes a blade seat cover 180 which covers the opening of the mounting groove 151, the blade seat cover 180 is detachably connected to the blade seat 150, and the blade seat cover 180 is defined with a shaft hole 181 for inserting the shaft 181.

The blade seat cover 180 make the mounting groove 151 form a relatively closed space, which closes the connecting part between the shaft 113 and the clasp assembly, and the distance control assembly 160 in the mounting groove 151. Thereby the components in the mounting groove 151 are protected, while the clasp assembly is prevented from separating from the shaft 113.

Figure 10:
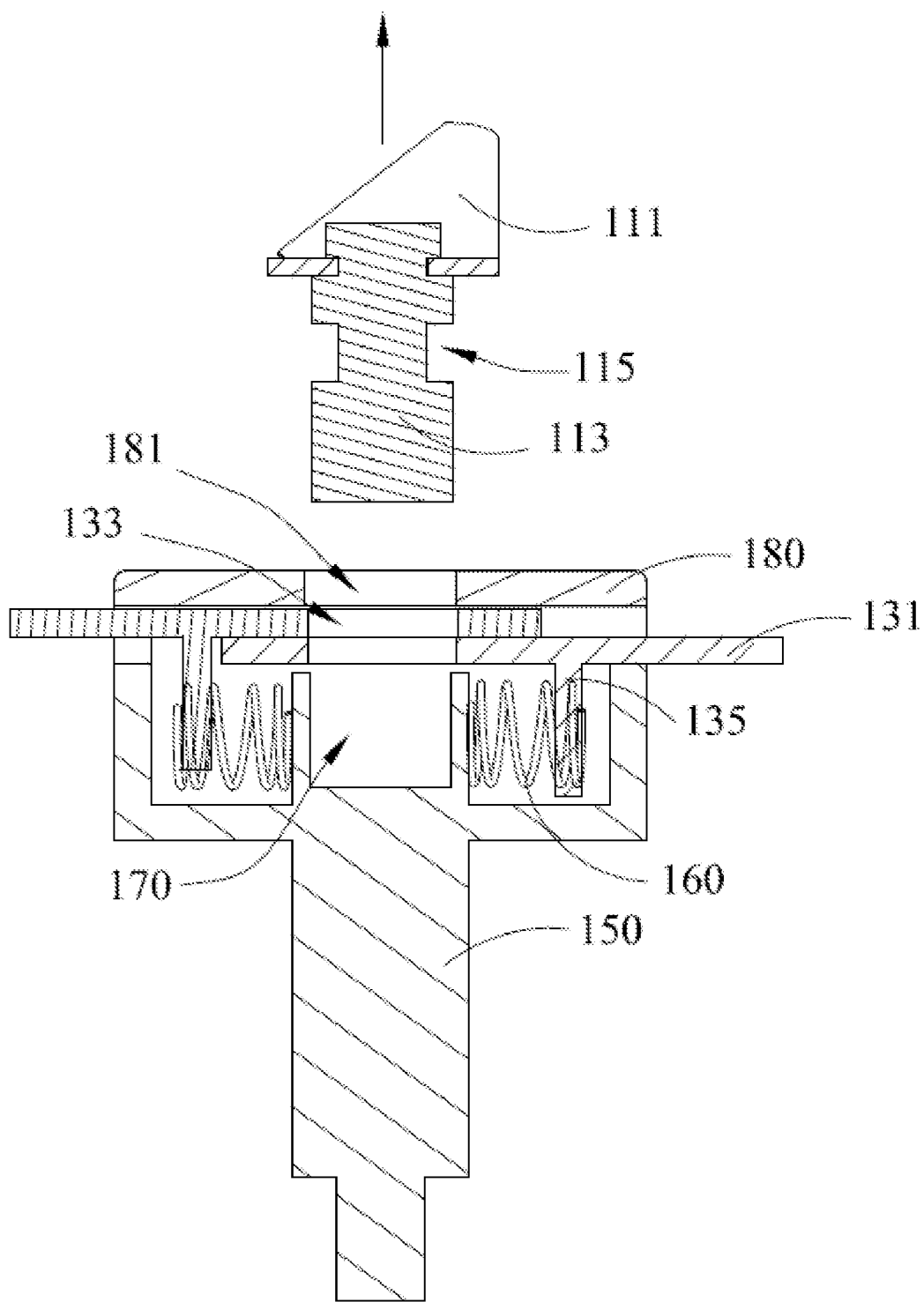
FIG. 10 is a schematic structural diagram of the blade seat assembly shown in FIG. 7, in which the shaft is spaced apart from the blade seat.

Referring again to FIGS. 9 and 10, a user may press the operation portions of the two clasps 130 toward the center of the shaft 113 by using two fingers of the same hand to release the shaft 113. The user may also use another hand to lift the blade assembly 110 vertically upward to realize the separation of the blade assembly 110 from the blade seat 150, thus disassembling of the blade assembly 110.

When mounting the blade seat assembly 100, it is only necessary to press the operation portions of the two clasps 130 to completely place the shaft 113 in the mounting groove 151 of the blade seat 150, and then to loosen the two clasps 130. At this time, the two clasps 130 are clasped in the groove 115 again under the elastic force of the elastic assembly, making the shaft 113 locked and fixed to prevent the shaft 113 from falling out.

The present disclosure also provides a blending cup assembly, which includes a blending cup (not numbered) and a blade seat assembly 100, and one end of the blade seat assembly 100 which defines a blade assembly 110 is positioned in the blending cup.

The blending cup assembly further includes an upper clutch 300, and one end of the blade seat assembly 100 away from the blending cup is connected to the upper clutch 300.

Figure 11:
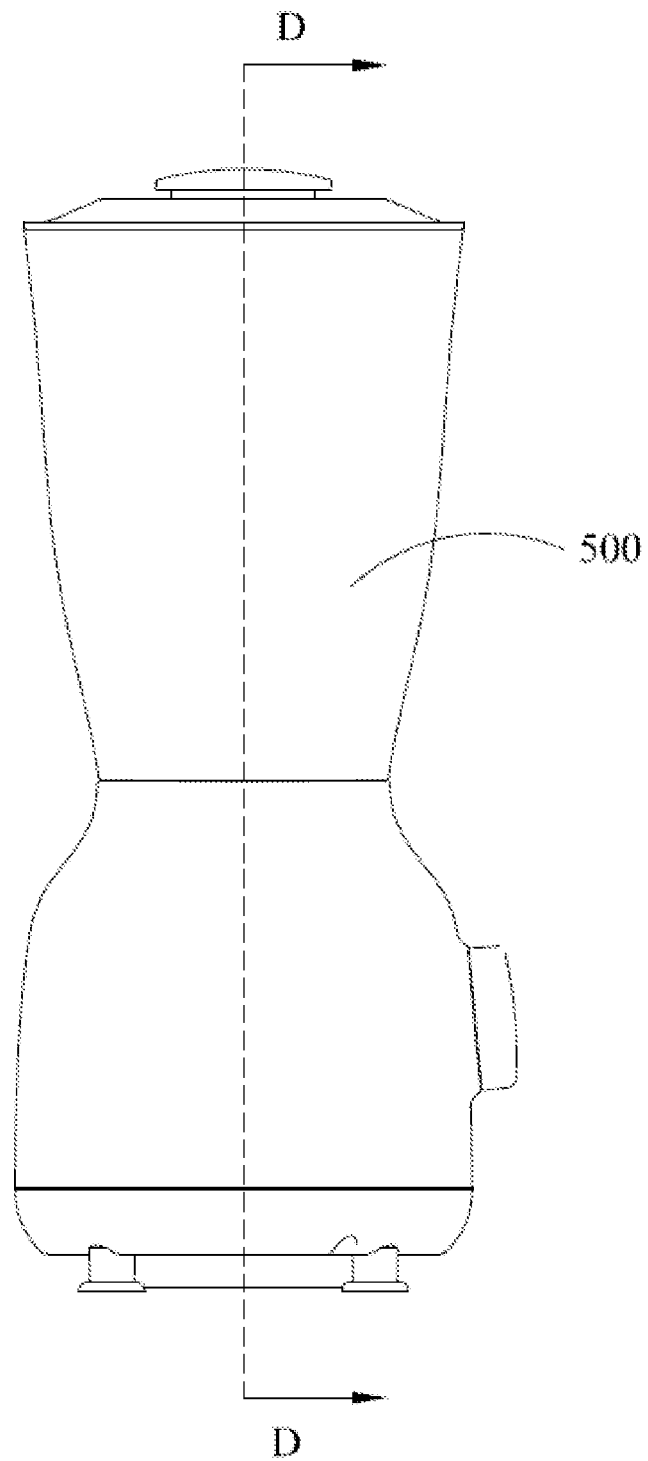
FIG. 11 is a perspective structural diagram of a food processor of the present disclosure.
Figure 12:
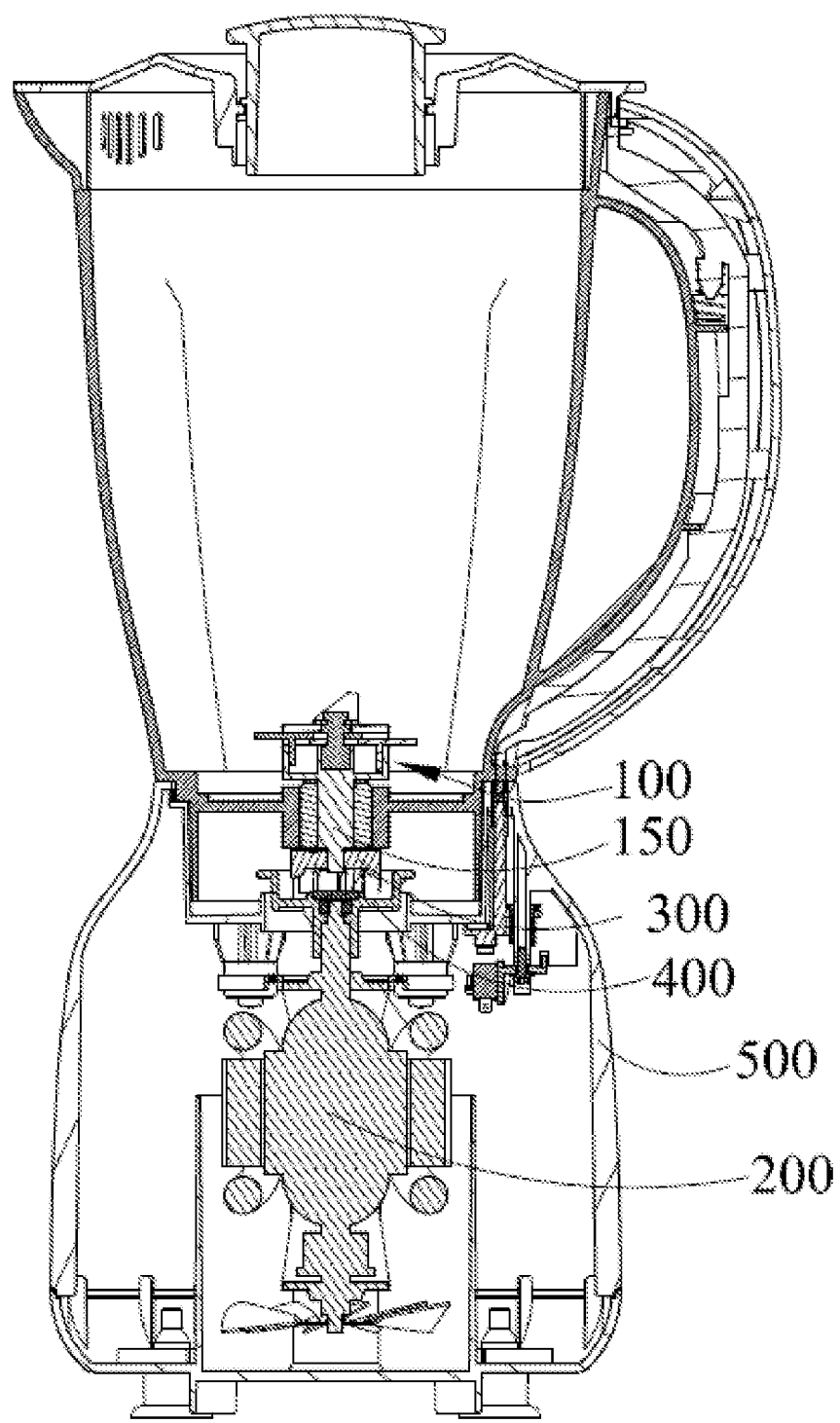
FIG. 12 is a schematic cross-sectional structural view of the food processor shown in FIG. 11 along line D-D.

Referring to FIGS. 11 to 12, the present disclosure also provides a food processor, which may be a blender, a wall-breaking cooking machine or a soy-bean milk maker, including a main engine (not numbered), a heating device, and a blending cup assembly. the blending cup assembly is defined upon the main engine; the main engine is defined with a motor 200 for driving the blade seat assembly 100 to rotate, and the heating device is configured for heating the blending cup.

The main engine also includes a housing 500 and a lower clutch 400 connected to the motor 200. The motor 200 is located in the housing 500. When the food processor works, the upper clutch 300 engages with the lower clutch 400. The motor operates and drives the blade seat assembly 100 to rotate, and the blade assembly 110 rotates synchronously.

The heating device includes a coil disk assembly defined in the main engine, and a magnetic conductive disk defined at the bottom of the blending cup, and the coil disk assembly and the magnetic conductive disk are oppositely defined; or the heating device includes a heat conducting plate defined at the bottom of the blending cup, and an electric heating tube or an electric heating film, which is defined at the bottom of the heat conducting plate.

The above is only the preferred embodiment of the present disclosure, and is not therefore limiting the scope of the patent disclosure. Any equivalent structural change made under the inventive concept of the present disclosure using the contents of the present disclosure specification and drawings, or directly/indirectly applied in other related technical fields, is included in the scope of the patent protection of the present disclosure.

What is claimed is:

1. A blade seat assembly, comprising a blade assembly, a clasp assembly, and a blade seat; wherein:
   the blade assembly comprises a blade and a shaft, the blade is connected to one end of the shaft;
   the blade seat defines a mounting groove, and the other end of the shaft detachably is connected to the mounting groove via the clasp assembly;
   the clasp assembly comprises two oppositely defined clasps, each of the clasps comprises a respective main body which defines a respective through hole therein, the two clasps overlap along an extension direction of the shaft, the respective through holes of the two clasps at least partially overlap, the shaft passes through an overlapping area of the respective through holes of the two clasps, and a wall of the shaft defines a groove therein;
   when the clasp assembly locks the shaft in the mounting groove, a wall of each of the respective through holes of the clasps abuts against a wall of the groove; and
   when the clasp assembly releases the shaft from the mounting groove, the wall of each of the respective through holes is spaced apart from the wall of the groove to allow the shaft to pass through the respective through holes.

2. The blade seat assembly according to claim 1, wherein the wall of the groove of the shaft and/or the wall of each of the respective through holes has an anti-skid structure.

3. The blade seat assembly according to claim 1, wherein one end of the respective main body which defines the respective through hole for each of the clasps is accommodated in the mounting groove, the end of the respective main body away from the respective through hole for each of the clasps is an operation portion defined outside the mounting groove.

4. The blade seat assembly according to claim 1, wherein the blade seat assembly further comprises a distance control assembly, which is configured to adjust a distance between the wall of the respective through hole of each of the clasps and the wall of the groove, allowing the wall of the respective through hole of each of the clasps to abut against or space apart from the wall of the groove.

5. The blade seat assembly according to claim 4, wherein a bottom portion of the mounting groove defines an inserting groove, and one end of the shaft away from the blade is connected to the inserting groove.

6. The blade seat assembly according to claim 5, wherein each of the clasps further comprises a baffle defined in the mounting groove, the bottom portion of the mounting groove defines an insertion column, and the inserting groove is defined at one end of the insertion column away from the bottom portion of the mounting groove; the baffle is perpendicular to the respective main body of said each of the clasps, and is spaced apart from and opposite to an outer side wall of the insertion column; the distance control assembly is an elastic component, and the elastic component is elastically compressed between the baffle and the outer side wall of the insertion column.

7. The blade seat assembly of claim 4, wherein one end of the wall of the mounting groove away from a bottom portion of the mounting groove defines a limiting groove by recessing toward the bottom portion of the mounting groove, the limiting groove passes through the wall of the mounting groove, and the respective main body of at least one of the clasps passes through the limiting groove.

8. The blade seat assembly of claim 1, wherein one end of the wall of the mounting groove away from a bottom portion of the mounting groove defines a limiting groove by recessing toward the bottom portion of the mounting groove, the limiting groove passes through the wall of the mounting groove, and the respective main body of at least one of the clasps passes through the limiting groove.

9. The blade seat assembly of claim 1, wherein one end of the wall of the mounting groove away from a bottom portion of the mounting groove defines a limiting groove by recessing toward the bottom portion of the mounting groove, the limiting groove passes through the wall of the mounting groove, and the respective main body of at least one of the clasps passes through the limiting groove.

10. The blade seat assembly of claim 1, wherein the blade seat assembly further comprises a blade seat cover, which covers an opening of the mounting groove, detachably is connected to the blade seat, and defines a shaft hole configured to insert the shaft.

11. The blade seat assembly of claim 1, wherein the blade seat assembly further comprises a blade seat cover, which covers an opening of the mounting groove, detachably is connected to the blade seat, and defines a shaft hole configured to insert the shaft.

12. A blending cup assembly, comprising a blending cup and a blade seat assembly, wherein one end of the blade seat assembly which defines a blade assembly is located in the blending cup, and the blade seat assembly comprises the blade assembly, a clasp assembly, and a blade seat; wherein:
the blade assembly comprises a blade and a shaft, the blade is connected to one end of the shaft;
the blade seat defines a mounting groove, and the other end of the shaft detachably is connected to the mounting groove via the clasp assembly;
the clasp assembly comprises two oppositely defined clasps, each of the clasps comprises a respective main body which defines a respective through hole therein, the two clasps overlap along an extension direction of the shaft, the respective through holes of the two clasps at least partially overlap, the shaft passes through an overlapping area of the respective through holes of the two clasps, and a wall of the shaft defines a groove therein;
when the clasp assembly locks the shaft in the mounting groove, a wall of each of the respective through holes of the clasps abuts against a wall of the groove; and
when the clasp assembly releases the shaft from the mounting groove, the wall of each of the respective through holes is spaced apart from the wall of the groove to allow the shaft to pass through the respective through holes.

13. The blending cup assembly according to claim 12, wherein the blending cup assembly further comprises an upper clutch, and one end of the blade seat assembly away from the blending cup is connected to the upper clutch.

14. A food processor, comprising a main engine, a heating device, and a blending cup assembly, the blending cup assembly comprises a blending cup and a blade seat assembly, one end of the blade seat assembly which defines a blade assembly is located in the blending cup, and the blade seat assembly comprises a blade assembly, a clasp assembly, and a blade seat; the blade assembly comprises a blade and a shaft, the blade is connected to one end of the shaft; the blade seat defines a mounting groove, and the other end of the shaft detachably is connected to the mounting groove via the clasp assembly, and the blending cup assembly is defined upon the main engine which comprises a motor, the motor is configured to drive the blade seat assembly to rotate, and the heating device is configured for heating the blending cup, wherein:
the clasp assembly comprises two oppositely defined clasps, each of the clasps comprises a respective main body which defines a respective through hole therein, the two clasps overlap along an extension direction of the shaft, the respective through holes of the two clasps at least partially overlap, the shaft passes through an overlapping area of the respective through holes of the two clasps, and a wall of the shaft defines a groove therein;
when the clasp assembly locks the shaft in the mounting groove, a wall of each of the respective through holes of the clasps abuts against a wall of the groove; and
when the clasp assembly releases the shaft from the mounting groove, the wall of each of the respective through holes is spaced apart from the wall of the groove to allow the shaft to pass through the respective through holes.

15. The food processor according to claim 14, wherein the blending cup assembly further comprises an upper clutch, and one end of the blade seat assembly away from the blending cup is connected to the upper clutch.

16. The food processor according to claim 15, wherein the heating device comprises a coil disk assembly defined in the main engine, and a magnetic conductive disk defined at a bottom of the blending cup, and the coil disk assembly and the magnetic conductive disk are oppositely defined; or the heating device comprises a heat conducting plate defined at the bottom of the blending cup, and an electric heating tube or an electric heating film, which is defined at a bottom of the heat conducting plate.

17. The food processor according to claim 14, wherein the heating device comprises a coil disk assembly defined in the main engine, and a magnetic conductive disk defined at a bottom of the blending cup, and the coil disk assembly and the magnetic conductive disk are oppositely defined; or the heating device comprises a heat conducting plate defined at the bottom of the blending cup, and an electric heating tube or an electric heating film, which is defined at a bottom of the heat conducting plate.

* * * * *